UNITED STATES PATENT OFFICE.

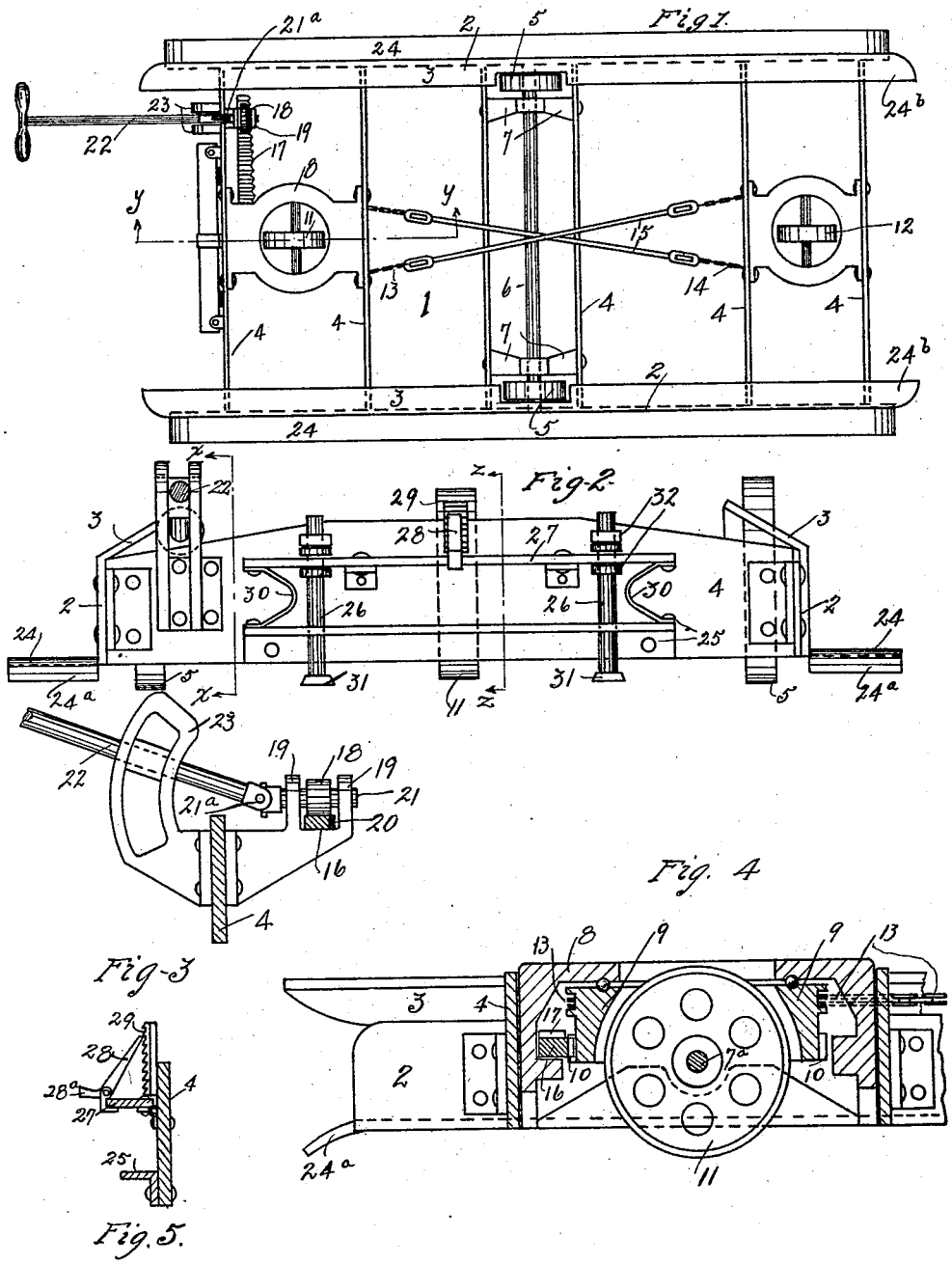

BENJAMIN K. HALL, OF SEATTLE, WASHINGTON, ASSIGNOR OF ONE-FOURTH TO A. F. EASTMAN, OF PIERCE COUNTY, WASHINGTON.

PORTABLE TURN-TABLE.

1,015,885. Specification of Letters Patent. Patented Jan. 30, 1912.

Application filed June 13, 1911. Serial No. 632,827.

*To all whom it may concern:*

Be it known that I, BENJAMIN K. HALL, a citizen of the United States, and a resident of Seattle, in the county of King and State of Washington, have invented certain new and useful Improvements in Portable Turn-Tables, of which the following is a specification.

This invention relates to portable turn tables especially adapted for use in garages where it is often desirable to draw the turn-table along and then turn the same substantially upon its own center so as to back the loaded turn-table into a stall, or some like movement. The inventor is fully aware that, generally considered, devices of this character are not new, but serious defects exist in the devices as they are now known in the art, chief of which is that as the front wheels of the automobile contact with the rear end of the turn-table the opposite end thereof is raised and as the automobile proceeds the turn-table is liable to swing around or pivot upon its center wheels so that the runways of the turntable are out of alinement with the forward path of the wheels. Another defect is that considerable care is necessary to see that the wheels of the automobile register with the rear ends of the runways of the turn-table before the automobile is moved onto the same. Still another defect is that when it is necessary to turn the front and rear wheels of the turn-table at angles to the center wheels in order to swing the turntable around its own center the means heretofore employed for this purpose is independent of the handle or tongue of the turn-table and has to be locked in its moved position before the turn-table is swung.

The object of this invention is to provide means to correct these defects, which will be fully described in the following specification, and shown in the accompanying drawings, in which—

Figure 1 is a plan view of the device. Fig. 2 a front view of the same. Fig. 3 an enlarged fragmentary view of the tongue and its connections, parts in section substantially upon the line $x-x$ of Fig. 2. Fig. 4 an enlarged fragmentary sectional view upon the line $y-y$ of Fig. 1, Fig. 5 a similar view of the locking means on the line Z—Z of Fig. 2.

Referring now more particularly to the drawings, 1 designates the frame of the turn-table which is formed of the side pieces 2, having the inwardly converging top portions 3, and joined together by the cross braces 4.

5 designates wheels midlength of the frame 1, the axle 6 of which is revolubly mounted in the braces 7 which are rigid with two of the cross braces 4.

Revoluble within the casting 8 at the forward end of the frame 1 is the circular frame 9 which has the circular rack 10 around its periphery. Revolubly mounted within the frame 9, upon the center $7^a$, is the wheel 11. At the rear end of the frame 1 is similarly mounted the wheel 12. Around both the wheels 11 and 12 pass the chains 13 and 14, to the ends of which are secured the tie rods 15 having the turnbuckles for adjustment, as shown.

Slidably mounted across the forward end of the frame 1 is the straight rack bar 16 having the teeth 17 upon its upper face which mesh with the pinion 18 mounted in the brackets 19 which latter are rigid with the cross brace 4. Upon one side of the rack bar 16 are the teeth 20 which mesh with the teeth 10 around the frame 9. By means of the universal joint $21^a$ the shaft 21 of the pinion 18 is connected to the tongue 22 which is straddled by the brackets 23, and between which brackets the tongue 22 has a free vertical as well as a rotary movement, the handle or tongue 22 being circular in cross section.

Projecting from the sides of the frame 1 are the ledges 24, downwardly bent as at $24^a$, which, together with the sides 2, flared as at $24^b$, form the runways for the automobile wheels.

Secured to the cross brace 4 at the forward end of the frame 1 is the angle iron 25 through which loosely pass the legs 26. Immediately above the angle iron 25 is hinged the plate 27 to which is pivoted the pawl 28 which coöperates with the ratchet teeth 29 upon the brace 4. The plate 27 is normally held in the position shown by the springs 30. The bottoms of the legs 26 may have the rubber or other resilient feet 31, and around their upper ends, at each side of the plate 27 are the collars 32. The apertures in the plate 27 and angle iron 25 through which pass the legs 26 are somewhat larger than the legs so as to permit a substantially vertical movement of the legs through the angle iron 25.

The wheels 5 are of slightly greater diameter than the wheels 11 and 12, so that when the frame 1 is parallel with the floor the wheels 11 and 12 are out of contact therewith, as clearly shown in Fig. 2.

It is believed from the foregoing that the construction and operation of the device will be fully understood by those skilled in the art. It is clear that as the front wheels of the automobile ride up on the curved ends 24ᵃ at the rear of the frame 1 the forward end of the frame will be tilted upwardly until the rear wheel 12 contacts with the floor, and at this time if the hinged plate 27 be forced downwardly by the foot of the operator the feet 31 of the legs 26 will be thus brought into firm contact with the floor and held there by the pawl 28 and teeth 29, and the intervening mechanism, thereby preventing any pivoting of the frame 1 laterally so that the runways remain directly in the forward path of the automobile. When the turn-table has fully received the automobile the hinged plate 27 may be released by pressure of the foot upon the tail 28ᵃ of the pawl 28, thereby allowing the feet 31 to be raised from the floor. The turn-table may now be drawn forward to the point where it is desired to turn the same, when the tongue 22 may be rotated in either direction which, through the pinion 18, rack 16, teeth 10 and tie rods 15, causes the wheels 11 and 12 to move in unison to the desired angularity with reference to the wheels 5, and, upon force being exerted laterally upon the tongue 22, the turn-table with its load may be readily moved substantially about its own center and backed into a stall or other convenient position. If, in running the automobile on to the turn-table, the ends of the runways should not exactly register with the front wheels of the automobile, the wheels will ride up on the slanting portions 3 for a short distance and then slide down upon the ledges 24 into their proper positions.

I am aware that many changes in the details of construction will readily suggest themselves to others skilled in the art, without departing from the spirit and scope of the invention, and I do not, therefore, desire to be limited to the exact form herein shown and described.

What I claim as new and desire to protect by Letters Patent of the United States is—

1. The combination in a portable turn-table of central wheels the axis of rotation of which is at right angles to the longitudinal plane of the turn-table, front and rear wheels of smaller diameter than that of the central wheels, a tongue, connections between said tongue and said front and rear wheels whereby the axis of rotation of said front and rear wheels may be changed with relation to that of said central wheels, and means for holding the turn-table against pivoting upon its central wheels.

2. The combination in a portable turn-table of central wheels the axis of rotation of which is at right angles to the longitudinal plane of the turn-table, frames at either end and revolubly mounted with relation to the turn-table, connections between said frames, wheels revolubly mounted in said frames and of smaller diameter than said central wheels, a tongue having a free vertical and rotative movement with relation to the turn-table, rack and pinion means between one of said frames and said tongue whereby the axis of rotation of said front and rear wheels may be changed with relation to said central wheels, and means for preventing pivoting of the turn-table upon its central wheels.

3. The combination in a portable turn-table of runways flared at either end and having upwardly and inwardly projecting portions, of central wheels the axis of rotation of which is fixed at right angles to the longitudinal plane of the turn-table, frames at either end and revolubly mounted with relation to the turn-table, connections between said frames, wheels revolubly mounted within said frames and of smaller diameter than said central wheels, a tongue having a free vertical and rotary movement with relation to the turn-table, rack and pinion connections between one of said frames and said tongue whereby the axis of rotation of said front and rear wheels may be changed with relation to that of said central wheels, and means for preventing pivoting of the turn-table upon its central wheels.

4. The combination in a portable turn-table of inwardly and upwardly converging portions above its runways, central wheels fixed to revolve in the direction of the length of the main frame, frames at either end and revolubly mounted with relation to the main frame, connection between said front and rear frames, wheels revolubly mounted in said last mentioned frames and of smaller diameter than said central wheels, a tongue having a free vertical and a rotative movement with relation to the main frame, rack and pinion connections between one of said front and rear frames and said tongue whereby said front and rear frames may be rotated, friction feet upon the main frame movable into and out of contact with the floor and means for locking said feet in position when pressed against the floor.

BENJAMIN K. HALL.

Witnesses:
FRED P. GORIN,
H. RUPERT.

Copies of this patent may be obtained for five cents each, by addressing the "Commissioner of Patents, Washington, D. C."